J. F. MacINDOE.
FRICTION CONTROLLED GREASE CUP.
APPLICATION FILED JAN. 8, 1918.
1,279,567.
Patented Sept. 24, 1918.
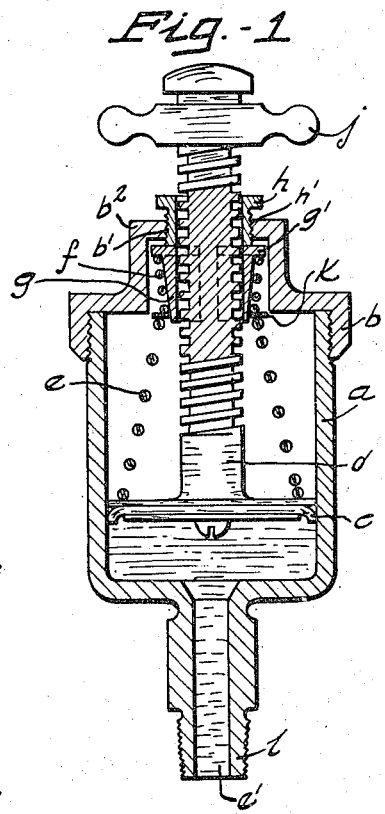
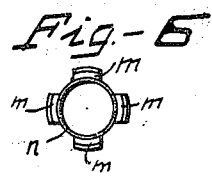
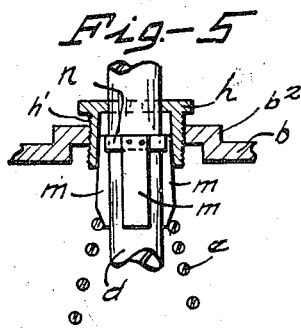
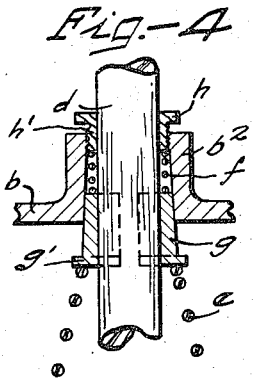
Witnesses
Mia Eberle.
N. Van Bosskirk
Inventor
John Franklin MacIndoe
By his Attorney
Mahlon van Bosskirk

UNITED STATES PATENT OFFICE.

JOHN FRANKLIN MacINDOE, OF FALLS OF SCHUYLKILL, PENNSYLVANIA.

FRICTION-CONTROLLED GREASE-CUP.

1,279,567.  Specification of Letters Patent.  Patented Sept. 24, 1918.

Application filed January 8, 1918. Serial No. 210,901.

*To all whom it may concern:*

Be it known that I, JOHN FRANKLIN MacINDOE, a citizen of the United States, residing at Falls of Schuylkill, in the county of Philadelphia and State of Pennsylvania, have invented certain new and useful Improvements in Friction-Controlled Grease-Cups, of which the following is a specification.

My invention relates to improvements in friction controlled spring compression grease cups.

By reason of the inability to effectively control the discharge of the grease the ordinary type of spring compression grease cup lacks the economic features of my invention. This inability results from the varying pressures caused by the changes in the pressure of the spring as the plunger descends, ranging from an extreme and therefore superfluous pressure at the initial part of the stroke to a mere clearance pressure at the terminus of the stroke. A flooding discharge of grease therefore follows at the beginning of the stroke, which is wasteful, changing to a gradually reduced flow until the minimum discharge is reached.

Regulating the discharge of the grease, or compensating for the varying of pressures, so that an economical discharge of the grease is maintained is necessary for economic and other reasons, and in the usual type of grease cups to obtain this result a regulating screw is placed in the shank of the cup.

The orifice controlled by this screw is lessened by turning the screw by means of a screw driver so that a slow movement of grease results when the plunger begins its stroke and the plunger spring is exerting its maximum strength. However, as the plunger descends and the spring weakens, the flow of the grease is either decreased or stopped entirely when the plunger has descended and the spring weakened before completing the stroke. In order to prevent the bearing from heating it is necessary to again adjust the screw and the discharge area is again increased to permit of the flow of the grease. For these reasons it is incumbent upon the operator to make constant adjustments by hand and if the adjustments are not made the cup will flood by forcing too much grease therefrom during the first part of the stroke, said cup being adjusted to secure a slow flow during the first part of the stroke as aforesaid, or when the plunger descends to the point where the spring has weakened, a stoppage or reduced flow results.

In ordinary practice the regulating screw is not adjusted to obtain a regular discharge but the operator depends, to a great extent, upon the thumb screw which is used to draw up the plunger so that the cup can be filled and again placed in an operating position.

The objects of my present invention are to provide a simple yet durable device to automatically control the descent of the plunger by means of frictional resistance applied to the plunger stem, whereby the frictional or compensating spring will compensate for the wear of the contacts or stem. A non-automatic or springless friction contact would require for this purpose either a replacement of parts or of the plunger stem to insure an effective and continuously effective control, for as soon as wear took place the grip of the contacts would be lost and the plunger would slip down out of control and would necessitate a maintenance of accuracy of fit that would not be essential with my construction. With the use of my spring controlled frictional contacts a greater amount of service will be rendered by the cup, with a minimum of replacements or repairs. My device can be applied to the present type of spring compression grease cups.

With these and other objects in view my invention consists in the new and novel construction, arrangement and combination of parts hereinafter described and claimed and illustrated in the accompanying drawings wherein, Figure 1 is a vertical sectional view of a lubricator constructed in accordance with my invention, after most of the lubricant has been discharged therefrom.

Fig. 2 is a plan view of the segmental contacts, three being shown.

Fig. 3 is a side elevation of a segmental contact.

Fig. 4 is a vertical sectional view of a lubricator, parts being broken away, illustrating the segmental contacts applied in inverse order to that shown in Fig. 1.

Fig. 5 is likewise a vertical sectional view of a lubricator, similar to Fig. 4, illustrating the use of a steel spring collet instead of the segmental contacts, and Fig. 6 is a plan view of the collet used.

Like parts are referred to by like reference characters throughout the drawings.

Referring to said drawings in detail the character *a* designates the body or cup of the usual type of grease lubricator, closed at the top by a cap or cover *b* and has at the bottom a nozzle *l* exteriorly threaded and an outlet passage *e'* for the passage of the grease, and is provided with the usual threaded plunger stem *d* of a plunger *c* which fits snugly to the inner wall of the cup *a* and is acted upon by a coiled spring *e* disposed between the washer *k* and the plunger *c* and tending to constantly depress said plunger.

The threaded plunger stem *d* passes freely through an opening in the cap *b* and is provided above said cap with a thumb or adjusting nut *j* which can be adjusted on said stem so that by contact with the cap *b* it will limit, to any desired extent, the depression of the plunger *c*, under the pressure of the spring *e*.

The cover *b* is separable and is interiorly threaded to engage the exteriorly threaded portion of the cup *a* as illustrated and has integral therewith the raised or dome like portion $b^2$, as shown, of sufficient height to accommodate the contacts *g*, the compensating spring *f* and the washer *k* as illustrated.

An adjusting screw *h* provided with an exteriorly threaded portion *h'* engages the interiorly threaded portion *b'* of the cover *b*. The purpose of this adjusting screw *h* being so secured is to provide means to regulate the pressure proportionately to the operating pressure of the spring *e*.

Two or more segmental contacts *g* are provided, substantially cone shaped as particularly illustrated in Fig. 3. These segments when assembled around and in contact with the plunger stem *d*, preferably with the tapered portion thereof extending downwardly, and being encompassed by the washer *k*, which in turn is surrounded by the compensating spring *f*, form in effect a clutch. The stem *d* has sufficient space between said segments *g* to permit of them being forced into a close contact with said stem by the action of the spring *e* when compressed. The said segments *g* are provided with the flanges *g'* as illustrated.

The operation briefly is as follows: Assuming that the plunger *c* is at its downward limit in cup body *a*, the friction or compensating spring *f* is in its relaxed or minimum pressure position, relieving proportionately the pressure against the segments or contacts *g*. By turning the thumb screw *j* which operates the plunger stem *d*, the said plunger *d* which is attached to and part of said stem *d*, is drawn upwardly compressing the plunger spring *e* which impinges against the washer *k*, thus compressing said compensating spring *f* upwardly, causing the segments or contacts *g* to register against the surface of the stem *d* applying a brake like effect thereto in proportion to the pressure effected by the plunger or main spring *e*. When the plunger *c* is drawn up to its upper position the maximum brake pressure of contacts *g* is in effect against the stem *d*.

If desired the plunger spring *e* may impinge directly against the end of the compensating spring *f*.

As the plunger *c* begins its down stroke the brake pressure of the contacts *g* is released in proportion to the weakening of the spring *e*, duplicating mechanically a grip similar to the grip of a human hand, whereby muscular control the grip can be either tightened or relaxed as the occasion demands.

The plunger stem *d* may be constructed of hardened steel or other hardened metal, to reduce undue wear of said stem.

If desired, a lesser degree of accuracy of control resulting, the small end of the plunger spring *e* can impinge against the flange *g'* of the segmental contacts *g*, the pitch or taper of said contacts being inverted and thus provide in itself the varying pressures to said contacts which will release their grip on the stem *d* gradually as the spring descends and its pressure weakens. An inverse action takes place when the spring *e* is compressed insuring maximum frictional control when the plunger *c* is in position to start its downward stroke. This construction is illustrated particularly in Fig. 4. The compensating spring *f* in this particular construction is positioned between the adjusting screw *h* and the inverted base of said contacts *g*.

In Fig. 5 I have shown a modification of my device; in this instance employing a spring steel collet *n* instead of the segmental contacts *g* and eliminating the compensating spring *f*. Said collet *n* surrounds the plunger stem *d* and has the depending members *m*, beveled at substantially their base as shown. As the pressure is relieved said collet *n* expands outwardly from said stem *d* and as the compression takes place said collet *n* is forced into frictional contact with the stem *d* by reason of the plunger spring *e* impinging against the beveled portions of the members *m* as illustrated.

Various modifications in the details of construction may be made without departing from the scope of my invention.

Having thus described my invention what I claim as new and desire to secure by Letters Patent is:

1. In a grease cup, provided with a spring actuated plunger, means in frictional contact with the plunger stem and automatic means for increasing and decreasing the pressure of such contact in proportion to the pressure exerted by said plunger spring, substantially as shown and described.

2. In a grease cup, provided with a spring actuated plunger, means in frictional contact with the plunger stem and compression means for increasing and decreasing the pressure of such contact in proportion to the pressure exerted by said plunger spring, substantially as shown and described.

3. In a grease cup, provided with a spring actuated plunger, means in frictional contact with the plunger stem and means for increasing and decreasing the pressure of such contact in proportion to the pressure exerted by said plunger spring to increase and decrease the flow of lubricant from said cup, substantially as shown and described.

4. In a grease cup, provided with a spring actuated plunger, adjustable means applied to the plunger stem and automatic means to cause frictional contact thereof with said plunger stem whereby the pressure on said stem is increased and decreased in proportion to the pressure exerted by said plunger spring, to increase and decrease the flow of grease from said cup, substantially as shown and described.

5. In a grease cup, provided with a spring actuated plunger, adjustable means applied to the plunger stem and compression means to cause frictional contact thereof with said plunger stem whereby the pressure on said stem is increased and decreased in proportion to the pressure exerted by said plunger spring, to increase and decrease the flow of grease from said cup, substantially as shown and described.

6. In a grease cup, provided with a spring actuated plunger, means in frictional contact with the plunger stem and means to increase and decrease the pressure of such contact on said stem and thereby compensate for the excess pressure exerted by said plunger spring at the commencement of its compression, substantially as shown and described.

7. In a grease cup, provided with a spring actuated plunger, means in frictional contact with the plunger stem and a compression spring which is automatically compressed when said plunger is drawn to its uppermost position, and proportionately compressed as said plunger is being withdrawn, thereby increasing the pressure of the said contact on the said plunger stem, compensating for the varying pressures caused by the withdrawing of said plunger, to insure a regular discharge of the lubricant from said cup, substantially as shown and described.

8. In a grease cup, provided with a spring actuated plunger, means in frictional contact with the plunger stem and means operatively and automatically controlled by said plunger spring whereby when the plunger spring is compressed by the plunger being withdrawn to its uppermost position the pressure of the contact with said plunger stem is increased in proportion to the varying pressures exerted by said plunger spring, insuring a regular discharge of the lubricant from said cup, substantially as shown and described.

9. In a grease cup, provided with a spring actuated plunger, means in frictional contact with the plunger stem and means whereby the resistance of said plunger stem is increased and decreased in proportion to the pressure exerted by said plunger spring, to insure a regular discharge of the lubricant from said cup, substantially as shown and described.

10. In a grease cup, provided with a spring actuated plunger, means in frictional contact with the plunger stem and means to increase and decrease the resistance of said plunger stem to compensate for the excess pressure exerted by said plunger spring at the commencement of its compression and for the varying pressures thereof when being relaxed, to insure a regular discharge of the lubricant from said cup, substantially as shown and described.

11. In a grease cup, provided with a spring actuated plunger, a plurality of segmental sections adapted to encircle the plunger stem, means to force said sections into a frictional contact on said plunger stem and to increase and descrease the pressure of such contact, proportionately with the pressure exerted by said plunger spring, substantially as shown and described.

12. In a grease cup, provided with a spring actuated plunger, multiple segmental sections adapted to encircle the plunger stem, means to hold said sections in position when assembled around said stem so that they form a single operating unit and means to increase and decrease the contacts on said plunger stem, proportionately with the pressure exerted by said plunger spring, substantially as shown and described.

13. In a grease cup, provided with a spring actuated plunger, a plurality of segmental sections adapted to encircle and in frictional contact with the plunger stem, means encircling said sections to hold them in position on said stem, a compression spring operatively positioned so that by the compression of the plunger spring it will be compressed therewith, thereby increasing the pressure of said contact on said stem, to insure a regular discharge of the lubricant from said cup, substantially as shown and described.

14. In a grease cup, provided with a spring actuated plunger, a plurality of tapering segmental sections adapted to encircle and in frictional contact with the plunger stem provided on their upper portions with flanges, a washer encircling said sections, a compression spring positioned between said flanges and said washer, so that by the compression of the plunger spring, said compression spring is compressed therewith, causing the pressure of said contact on said stem to be increased proportionately with the pressure exerted by the plunger spring, substantially as shown and described.

15. In a grease cup, provided with a spring actuated plunger, a plurality of tapering, segmental sections adapted to encircle and in frictional contact with the plunger stem provided on their upper portions with flanges, said tapering segmental sections being inverted with the tapering portions extending upwardly, a compression spring operatively positioned so that by the compression of the plunger spring it will be compressed therewith, thereby increasing the pressure of said contact on said stem, to insure a regular discharge of the lubricant from said cup, substantially as shown and described.

16. In a grease cup, provided with a spring actuated plunger, a separable cover therefor, a plurality of tapering segmental sections adapted to encircle and in frictional contact with the plunger stem provided on their upper portions with flanges, said segmental sections being inverted with the tapering portions extending upwardly, an adjusting screw adapted to be threaded into said cover, a compression spring positioned between the inverted base of said sections and the said adjusting screw, so that by the compression of the plunger spring, it impinging against said flanges, said compression spring is compressed therewith, causing the pressure of said contact on said stem to be increased proportionately with the pressure exerted by the plunger spring, substantially as shown and described.

17. In a grease cup, provided with a spring actuated plunger, a separable cover therefor interiorly threaded to engage the exterior threads of said cup, a plurality of segmental contacts adapted to encircle the plunger stem, and means to force said contacts into frictional contact with said plunger stem and to increase and decrease the pressure thereof, said cover being constructed to provide for the positioning therein of said segmental contacts and of said means to enforce the frictional contact thereof with said plunger stem, so as to insure a regular discharge of the lubricant from said cup, substantially as shown and described.

18. In a grease cup, provided with a spring actuated plunger, a spring steel collet adapted to encircle and in frictional contact with the plunger stem having depending therefrom members beveled at substantially their base, the plunger spring impinging against said beveled bases, so that by the compression of the plunger spring said collet increases its pressure on said stem, proportionately with the pressure exerted by the said plunger spring substantially as shown and described.

In testimony whereof I affix my signature in presence of two witnesses.

JOHN FRANKLIN MacINDOE.

Witnesses:
  MAHLAN VAN BAASKIRK,
  NICHOLAS QUINN.